United States Patent
Dodd et al.

(10) Patent No.: US 10,410,068 B2
(45) Date of Patent: Sep. 10, 2019

(54) DETERMINING THE POSITION OF AN OBJECT IN A SCENE

(71) Applicants: Sony Corporation, Tokyo (JP); Sony Europe Limited, Weybridge (GB)

(72) Inventors: Luke Dodd, Winchester (GB); Paul Hawkins, Shawford (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 160 days.

(21) Appl. No.: 15/611,816

(22) Filed: Jun. 2, 2017

(65) Prior Publication Data

US 2018/0005049 A1    Jan. 4, 2018

(30) Foreign Application Priority Data

Jun. 29, 2016 (GB) .................................. 1611275.7

(51) Int. Cl.
*G06K 9/00* (2006.01)
*G06T 7/60* (2017.01)
(Continued)

(52) U.S. Cl.
CPC .......... *G06K 9/00791* (2013.01); *G06T 7/593* (2017.01); *G06T 7/60* (2013.01);
(Continued)

(58) Field of Classification Search
CPC ...................................................... G06T 7/70
See application file for complete search history.

(56) References Cited

U.S. PATENT DOCUMENTS 6,363,169 B1 * 3/2002 Ritter ...................... G06T 17/10
                                                    382/154
6,974,373 B2 * 12/2005 Kriesel ................ A01K 11/008
                                                    452/157
(Continued)

FOREIGN PATENT DOCUMENTS

GB         2 134 742         8/1984

*Primary Examiner* — Nay A Maung
*Assistant Examiner* — Jose Torres
(74) *Attorney, Agent, or Firm* — Oblon, McClelland, Maier & Neustadt, L.L.P.

(57) ABSTRACT

A method of determining the position of an object in a scene, comprising: receiving captured images of the scene, each image being captured from a different field of view of the scene, wherein a portion of the scene with a volume comprises a detectable object, the volume is divided into volume portions, and each volume portion is within the captured field of view of at least two of the captured images so that an image of each volume portion appears in the at least two of the captured images; detecting, for each volume portion in each of the captured images within which an image of that volume portion appears, whether or not an image of one of the detectable objects in the scene is positioned within a distance of the position of the image of that volume portion, a correspondence between the images of the detectable objects detected in the at least two of the images is established, the correspondence indicating that the images of the detectable objects detected in the at least two of the images correspond to a single detectable object in the scene, and the position in the scene of that volume portion is established as a position in the scene of the single detectable object.

21 Claims, 12 Drawing Sheets

(51) Int. Cl.
G06T 7/593 (2017.01)
G06T 7/70 (2017.01)

(52) U.S. Cl.
CPC ...... *G06T 7/70* (2017.01); *G06T 2207/10012* (2013.01); *G06T 2207/30108* (2013.01)

(56) References Cited

U.S. PATENT DOCUMENTS

| | | | |
|---|---|---|---|
| 6,990,228 B1 * | 1/2006 | Wiles | G06T 17/10 345/419 |
| 8,082,120 B2 * | 12/2011 | St-Pierre | G01C 11/02 356/601 |
| 2002/0024517 A1 | 2/2002 | Yamaguchi et al. | |
| 2005/0062954 A1 | 3/2005 | Wieneke | |
| 2007/0081714 A1 * | 4/2007 | Wallack | G06K 9/209 382/152 |
| 2008/0170750 A1 * | 7/2008 | Gordon | G06T 7/246 382/103 |
| 2008/0180436 A1 * | 7/2008 | Kraver | G06K 9/00228 345/420 |
| 2009/0080766 A1 * | 3/2009 | Daxauer | G01B 11/2545 382/154 |
| 2011/0025853 A1 * | 2/2011 | Richardson | H04N 5/2256 348/159 |
| 2013/0271573 A1 * | 10/2013 | Steinbichler | H04N 13/204 348/46 |
| 2016/0267661 A1 * | 9/2016 | Moteki | G06T 7/73 |

* cited by examiner

DETERMINING THE POSITION OF AN OBJECT IN A SCENE

CROSS REFERENCE TO RELATED APPLICATIONS

The present application claims priority to United Kingdom Application GB1611275.7 filed on 29 Jun. 2016, the contents of which being incorporated herein by reference in its entirety.

BACKGROUND

Field of the Disclosure

The present technique relates to determining the position of an object in a scene.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

It is often desirable to obtain information associated with a real life scene in order to generate a model of that scene. In particular, such information may be used to generate a computer model of a real life scene. Such computer models have a large range of applications, including, for example manufacturing, design, and other industrial type applications. In addition, in recent years, the use of such computer models has been applied to sporting events. Typical examples are the various Hawk-Eye® systems used for sports such as tennis, which allow the position of a ball within a scene to be tracked to a high level of accuracy. In such systems, the ball is detected in a plurality of images of the scene captured from different view points, and a 3D position of the ball in the scene is then determined on the basis of these images. A model of the ball is then positioned at the determined position in a 3D model of the scene so as to determine, for example, whether a rule of the sport has been broken. For example, with tennis, such systems are normally used to determine whether or not a ball has landed within or outside of the court. In this case, the 3D position of the ball in the scene is determined from a plurality of captured images of the scene, and once a model of the ball is inserted into a 3D model of the scene at the determined position, it can be seen whether or not the ball has crossed a line so as to land outside of the court.

It will be appreciated that, in order for the 3D model to be used effectively, the 3D model itself must be accurate. So, for example, to use again the tennis example, in order to accurately determine whether or not a ball has landed outside of the court, it must be ensured that the position of the lines defining the tennis court in the 3D model accurately represent the position of the lines defining the tennis court in the real scene. Currently, it is necessary to manually take many measurements of a real scene and to incorporate these measurements into the 3D model of the scene in order to generate a 3D model of suitable accuracy. This is time consuming and requires significant effort. The use of manual measurements also increases the risk of introducing inaccuracies into the model due to human error. Furthermore, in potential future applications of 3D modelling, such as the modelling of racing vehicles (such as NASCAR® racing cars) so as to check that certain aspects of the racing vehicle (such as body size and shape) conform to predetermined race regulations before a race commences, it is not possible to spend such large amounts of time and effort manually taking measurements of each vehicle (each vehicle being slightly different) in order to generate an accurate model of each vehicle.

There is therefore a need to be able to generate accurate 3D models of a scene with reduced time and effort and with a reduced chance of introducing human errors into the models.

SUMMARY

A method of determining the position of an object in a scene is described which comprises: receiving a plurality of captured images of the scene, each respective one of the plurality of images being captured from a different field of view of the scene, wherein a predetermined portion of the scene with a predetermined volume comprises a plurality of detectable objects, the predetermined volume is divided into a plurality of volume portions, and each volume portion is within the captured field of view of at least two of the captured images so that an image of each volume portion appears in the at least two of the captured images; detecting, for each volume portion in each of the captured images within which an image of that volume portion appears, whether or not an image of one of the detectable objects in the scene is positioned within a predetermined distance of the position of the image of that volume portion, wherein if an image of one of the detectable objects is detected to be positioned within a predetermined distance of the position of the image of that volume portion in at least two of the images within which an image of that volume portion appears, then a correspondence between the images of the detectable objects detected in the at least two of the images is established, the correspondence indicating that the images of the detectable objects detected in the at least two of the images correspond to a single detectable object in the scene, and the position in the scene of that volume portion is established as a position in the scene of the single detectable object.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
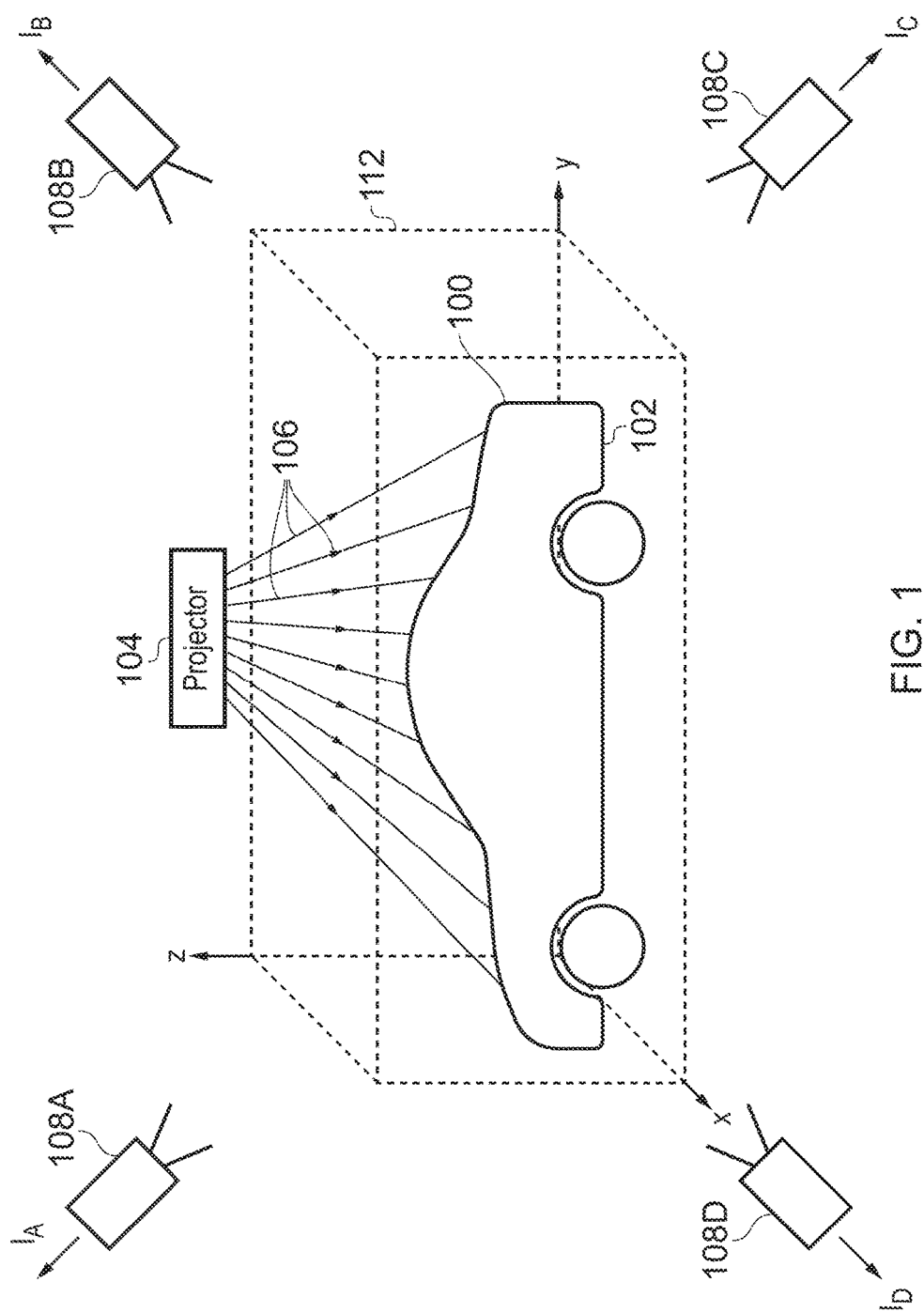
FIG. 1 schematically shows a first scene which is to be modelled.

Referring now to the drawings, wherein like reference numerals designate identical or corresponding parts throughout the several views.

FIG. 1 shows one setup according to an embodiment of the present technique. The setup illustrates how an accurate 3D model of a scene can be generated using the present technique.

In this case, the scene comprises a car 100 and it is desired that a 3D model of the outer body 102 of the car is generated. In order to generate such a model, a light projector 104 is used to project a plurality of light markers onto the outer body 102 of the car. The light projector 104 may comprise, for example, a laser which emits visible light through one or more beam splitters or like so that the light projector 104 emits a plurality of beams of laser light in different respective directions which then reflect off the surface of the outer body 102 of the car. A path 106 of each of a plurality of such beams is shown in FIG. 1. The visible reflection of each of the plurality of beams of laser light then acts as a marker on the outer body 102 of the car. Each marker is located at a point on the surface of the outer body 102 of the car and is recognisable in a captured image including that point on the surface of the outer body 102. In this case, since the markers are generated by projecting a plurality of beams of light on the outer body 102 of the car, the markers are referred to as light markers. In reality, there may be more than one projector 104 so as to ensure that light markers are projected onto all parts of the outer body 102 which are of interest. It will also be appreciated that any other type of marker which may be located at a point on the surface of the outer body 102 of the car and which is recognisable in a captured image including that point on the surface of the outer body 102 may be used. For example, physical markers which are distinguishable in an image from the surface decoration of the outer body 102 may be attached to the outer body 102 of the car using magnets or an adhesive or the like instead of using light markers.

Figure 2:
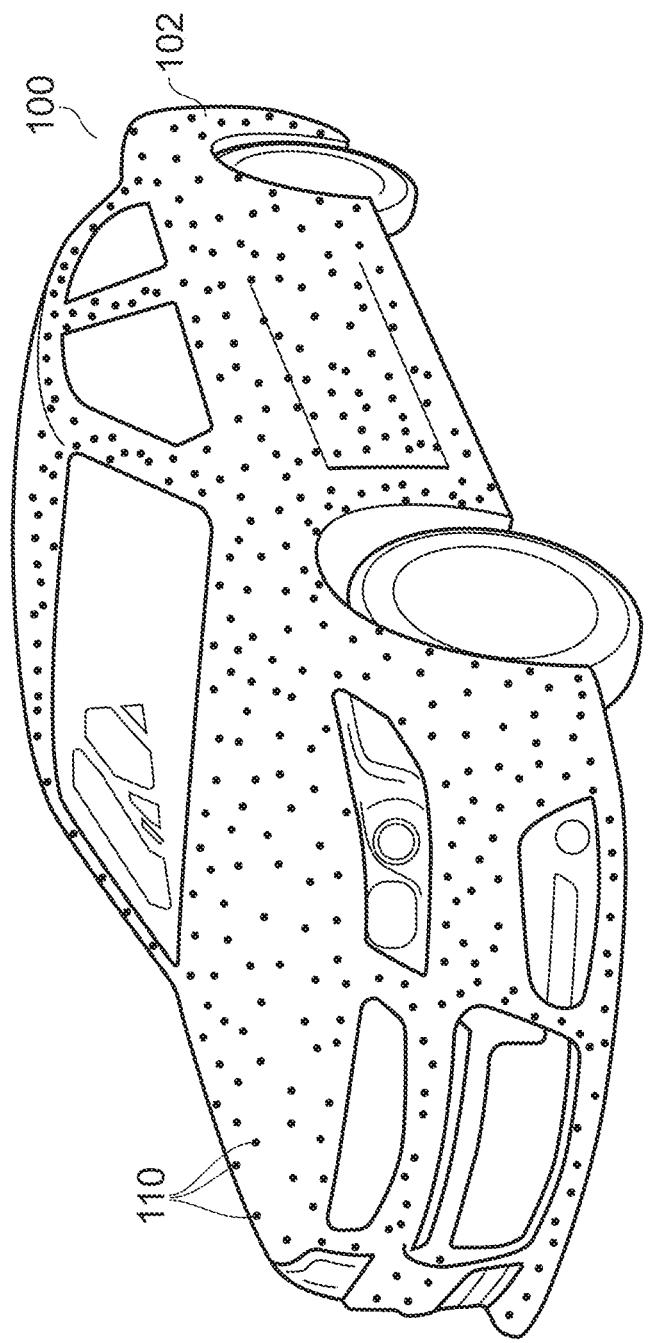
FIG. 2 schematically shows a perspective image of an object in the first scene when a number of markers are provided on the surface of the object.

FIG. 2 shows a perspective image of the car 100 when a large number of markers 110 are provided on the surface of the outer body 102 of the car. It can be seen that, when a sufficiently large number of markers are used and are distributed across the outer body 102 relatively evenly, the markers appear to represent the shape of the outer body 102. It is this principle which is used by the present technique in order to generate a 3D model of the outer body 102.

Returning to FIG. 1, it is seen that images of the car 100 are captured by a plurality of cameras 108A-D, wherein each camera captures an image of the car 100 from a different respective field of view. In this case, four cameras are used. However, it will be appreciated that the number of cameras will vary depending on the size of the scene to be modelled, the desired level of accuracy of the model and any other relevant parameters. The number of cameras and the position of each camera should be such that each point in the scene which is to be included in the model appears in images captured by at least two different cameras. This is necessary so as to enable depth information about that point to be determined from the captured images which, in turn, enables a 3D position in the scene of that point to be determined (the determination of a 3D position of a point in a scene from two or more 2D images of that point in the scene taken from different fields of view is known in the art and will therefore not be described in detail here). As will be described, by providing markers on the parts of the scene to be modelled (in this case, the outer body 102 of the car), the markers being recognisable in the images captured by the cameras, the images captured by the cameras can be used to determine the 3D position in the scene of each marker. When a sufficiently large number of markers are used and are distributed across the scene relatively evenly, a 3D model of the scene can thus be generated on the basis of the markers. More specifically, the 3D model of the scene is defined by the determined 3D position of each marker which, in turn, represents the position of a particular point in the scene. In this case, when the markers are distributed across the surface of the outer body 102 of the car in a fashion as shown in FIG. 2, for example, a 3D model of the outer body 102 can be generated on the basis of these markers, with the determined 3D position of each marker representing the position of a particular point of the outer body 102 in the scene.

In order to determine the 3D position of a marker captured in two or more images from different respective cameras, however, it is necessary to know the correspondence between markers in each image. That is, if a plurality of markers including a marker A are captured in a first image and a plurality of markers including the marker A are captured in a second image, then it must be known which of the captured markers is marker A in the first image and which of the captured markers is marker A in the second image in order for the 3D position in the scene of marker A to be accurately determined. This, however, is problematic, especially if all the markers have a similar appearance (as in the case, for example, when light markers generated by a single laser light source are used or when a large number of physically identical physical markers are used).

The present technique alleviates this problem by dividing up a predetermined portion of the scene with a predetermined volume into a plurality of volume portions and creating a mapping between the 3D position in the scene of each volume portion and the 2D position of an image of that volume portion in two or more captured images of the scene. For example, a predetermined portion of the scene containing the car 100 is shown as box 112 in FIG. 1. The part of the scene of interest on which the markers have been provided (that is, the part of the scene containing the car 100, in this case) is fully contained within the predetermined portion. The present technique will now be described in more detail. It would be appreciated that although the shape of the predetermined portion is rectangular in the foregoing, the technique is not so limited and any shape is envisaged.

For example, in the case that the scene of interest is a car, the predetermined portion may be approximately car-shaped.

Figure 3:
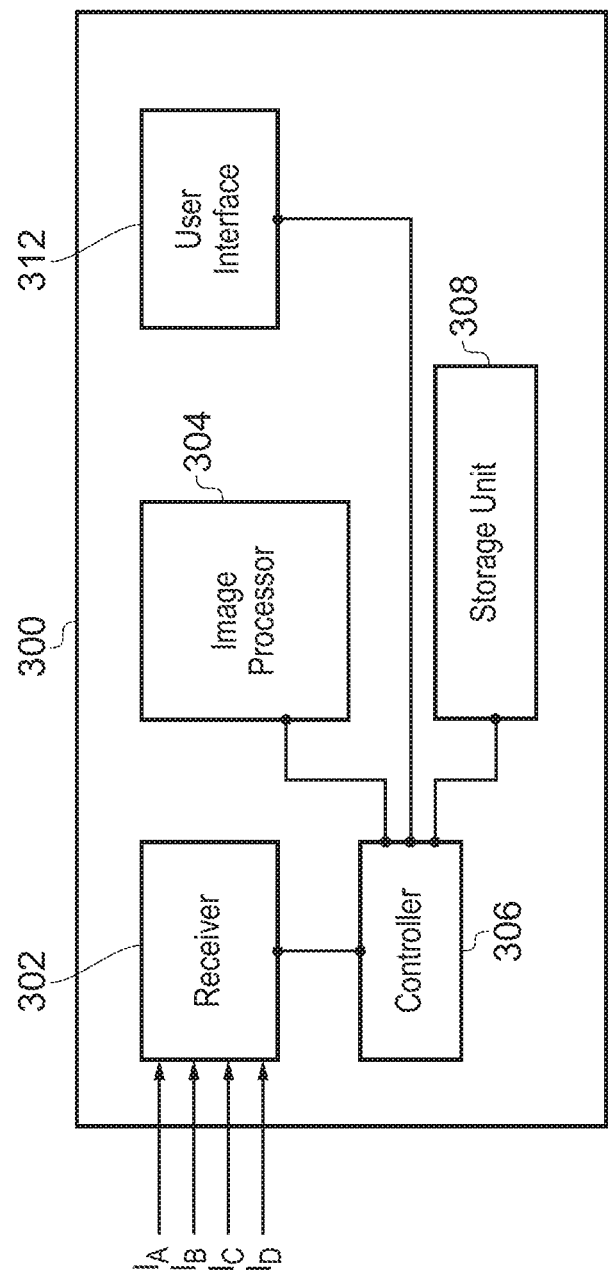
FIG. 3 schematically shows an image processing apparatus.

As shown in FIG. 1, image data $I_{A-D}$ representative of images respectively captured by each of the cameras 108A-D is output by the cameras. The image data $I_{A-D}$ is then fed to the image processing apparatus 300 shown in FIG. 3. This occurs via any suitable wired or wireless connection between the cameras 108A-D and image processing apparatus 300, for example. The image data $I_{A-D}$ is received by a receiver 302 of the image processing apparatus 300. Thus, the receiver 302 receives a plurality of captured images of the scene shown in FIG. 1, each respective one of the plurality of images being captured by a camera 108A-D with a different field of view of the scene. It is noted that the image processing apparatus 300 further comprises an image processor 304, a storage unit 308 for storing electronic data and a user interface 312 for carrying out at least one of outputting data to a user and receiving input data from a user. An example of the user interface 312 is a touch screen or the like. The image processing apparatus 300 also comprises a controller 306 for controlling the operation of each of the other components of the image processing apparatus.

As previously discussed, a predetermined portion 112 of the scene with a predetermined volume comprises a plurality of markers. In this case, the markers 110 are provided on the surface of the outer body 102 of the car 100, which is within the predetermined portion 112. Each marker is a detectable object, that is, an object which is recognisable in each of the captured images in which it appears using a suitable object recognition algorithm such as edge detection or the like. The predetermined volume of the predetermined portion 112 is divided into a plurality of volume portions. Each volume portion is within the field of view of at least two of the cameras so that an image of each volume portion appears in at least two of the captured images. This is exemplified with reference to FIG. 4.

Figure 4:
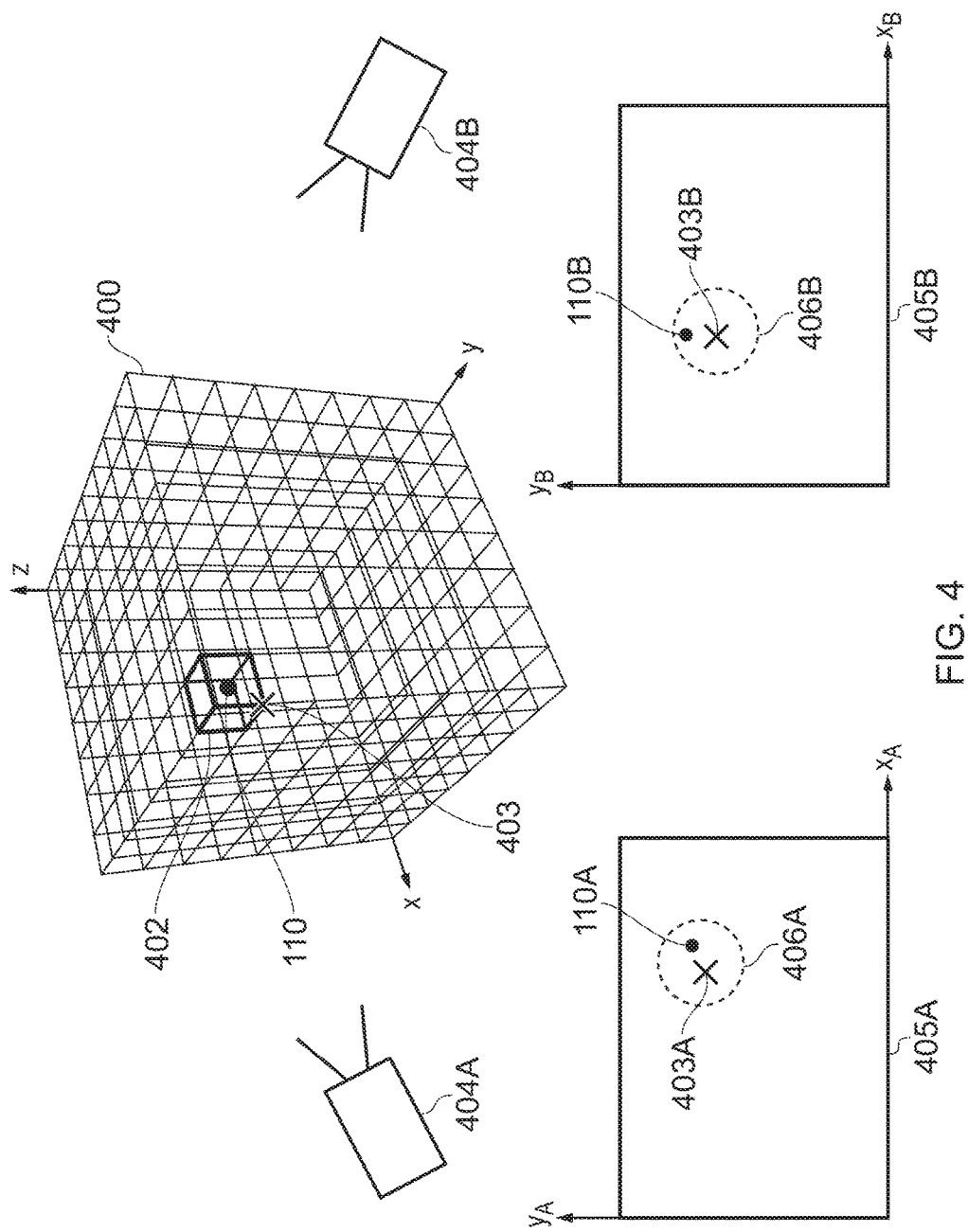
FIG. 4 schematically illustrates an arrangement for determining a correspondence and position of each of the markers.

For simplicity, FIG. 4 does not show the predetermined portion 112 of the scene in FIG. 1, but, rather in order to illustrate the principal of the present technique, shows a general cubic volume 400 divided into a set of smaller cubic volume portions 402. One of the cubic volume portions 403 is identified in FIG. 4 using bold lines. It can be seen that one of the markers 110 is within the volume portion 403. It will thus be appreciated that FIG. 4 is a simplified version of the situation shown in FIGS. 1 and 2, wherein a predetermined portion 112 of the scene containing the car 100 is divided up into a plurality of smaller volume portions. Each of the markers 110 projected on the surface of the outer body of the car 112 must therefore be located within one of the volume portions, as exemplified by the marker 110 being within the volume portion 403 shown in FIG. 4. The volume portions may, in general, take any size and shape, although they should be sufficiently small relative to the distance between adjacent markers 110 in the scene such that two markers are not found within the same volume portion (since this may cause problems with determining the correct correspondence between markers in different images).

Images of the scene 405A and 405B, including the portion of the scene within the cubic volume 400, are respectively captured by two cameras 404A and 404B, each camera having a different field of view of the scene. It will be appreciated that, in reality, two or more cameras may be used, as already explained (and as illustrated in FIG. 1). However, the example of two cameras is used here for the sake of simplicity. As previously discussed, there is a mapping between the 3D position in the scene of each volume portion 402 and the 2D position of an image of that volume portion in each of the two captured images of the scene. Thus, as shown in FIG. 4, for the 3D position of volume portion 403 (this being the position of the corner of volume portion 403 denoted 'X'), there is a corresponding 2D position in each of the captured images 405A and 405B. This corresponding 2D position is position 403A in image 405A and position 403B in image 405B. It can also be seen that images 110A and 110B of the marker 110 are respectively captured in each of the images 405A and 405B.

As previously explained, in order to generate an accurate 3D model of the scene based on markers such as marker 110, it is necessary to establish a correspondence between markers captured in images taken from different fields of view of the scene. In order to do this, for each volume portion in each of the captured images 405A and 405B within which an image of that volume portion appears, it is detected whether or not an image of one of the markers in the scene is positioned within a predetermined distance of the position of the image of that volume portion. This is exemplified in FIG. 4, in which it is detected, for the volume portion 403, whether an image of a marker is positioned within a predetermined distance of the position of the image of the volume portion 403A in the image 405A and whether an image of a marker is positioned within a predetermined distance of the position of the image of the volume portion 403B in the image 405B.

If an image of a marker is detected to be positioned within a predetermined distance of the image of the volume portion concerned in each of the images 405A and 405B (or, if there are more than two images, as occurs when more than two cameras are used, then in at least two of the images within which an image of the volume portion concerned appears), then a correspondence between the images of the markers detected in each of the images 405A and 405B is established. The correspondence indicates that the images of the markers detected in the images 405A and 405B correspond to a single marker in the real life scene. Furthermore, the position in the scene of the volume portion concerned is established as a position in the real life scene of that single marker. Thus, for example, in FIG. 4, for the volume portion 403, it can be seen in the image 405A that the image of the marker 110A is positioned within a predetermined distance of the position of the image of the volume portion 403A (that is, positioned within a circular boundary 406A centred at the position of the image of the volume portion 403A and with a radius equal to the predetermined distance) and it can be seen in the image 405B that the image of the marker 110B is positioned within a predetermined distance of the position of the image of the volume portion 403B (that is, positioned within a circular boundary 406B centred at the position of the image of the volume portion 403B and with a radius equal to the predetermined distance). Because of this, it can be concluded that the images of the marker 110A and 110B correspond to the same marker in the real life scene (which is the case, since the marker images 110A and 110B are both images of the marker 110 in the real life scene). Furthermore, the position in the real life scene of the volume portion 403 may be determined as the position in the real life scene of the marker 110.

Figure 5:
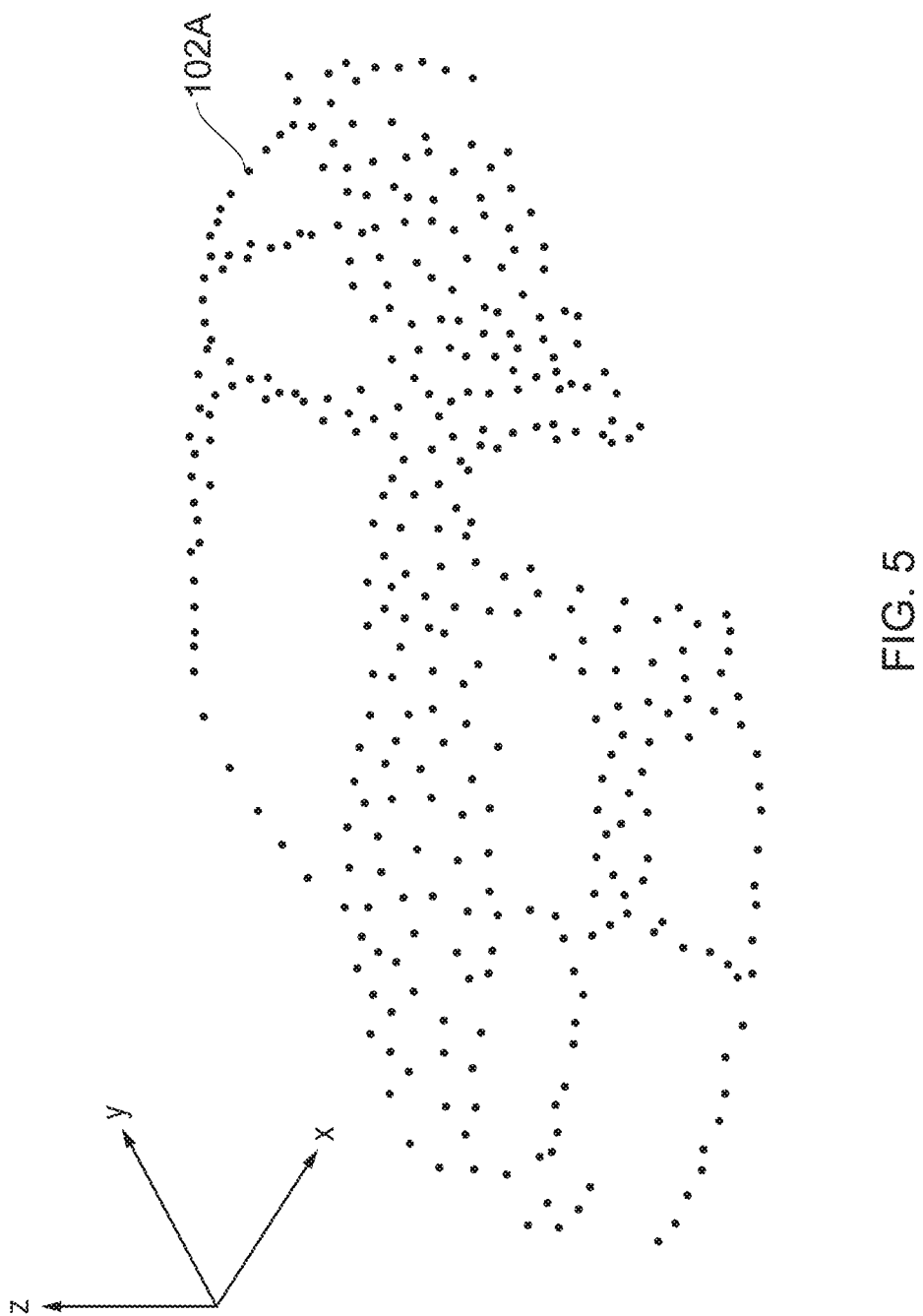
FIG. 5 schematically illustrates a generated 3D model of the object.

It will be appreciated that, by using the principal illustrated in FIG. 4 with the images captured by the cameras 108A-D in FIG. 1, it is possible to determine the position of each of the markers 110 provided on the surface of the outer body 102 of the car 100 for which a correspondence is established. In particular, the position of each marker will be the position of the volume portion in the predetermined portion 112 of the scene used to establish correspondence for that marker. A 3D model 102A of the outer body 102 of the car may then be generated, as illustrated in FIG. 5. It can be seen that the 3D model 102A is made up of the determined 3D position in the scene of each of the markers 110. The correspondence and 3D position of each of the markers 110 which defines the 3D model 102A is determined by the image processor 304 of the image processing apparatus 300, which receives the image data $I_{A-D}$ from the receiver 302 under the control of the controller 306. The 3D model is then stored in the storage unit 308 for further operations, an example of which is described below.

It will be appreciated that using the 3D position of the volume portion used to establish correspondence for a particular marker as the 3D position of that marker in the real life scene will introduce an inaccuracy into the model in the case that the position of the volume portion and the position of the marker are not actually the same. This is the case in FIG. 4, for example, where it can be seen that the 3D position of the marker 110 is not actually the same as the 3D position of the volume portion 403 (the 3D position of the volume portion 403 being the corner of the volume portion marked with an 'X') within which the marker 110 is located. In order to improve the accuracy of the determined 3D position of each marker, bundle adjustment can be used. With such bundle adjustment, the 3D position of the volume portion used to establish correspondence for each marker is used as an initial 3D position of that marker. These initial 3D marker positions are then used as an input, together with one or more initial parameters of the cameras (these having been previously determined in order to establish the 3D to 2D mapping of the positions of the volume portions of the predetermined portion 112 of the scene), for performing the bundle adjustment.

Bundle adjustment, in this context, aims to minimise the total re-projection error with respect to the 3D position of each of the markers in the scene and the one or more camera parameters. More specifically, bundle adjustment may be defined by the following expression:

$$\min_{a_j, b_i} \sum_{i=1}^{n} \sum_{j=1}^{m} v_{ij} d(Q(a_j, b_i), x_{ij})^2, \quad (1)$$

Here, $a_j$ is a vector representing the one or more camera parameters of the jth camera (capturing the jth image) when there are a total of m cameras (and thus m images of the scene captured from different viewpoints). The one or more camera parameters are used to define a relationship between the different viewpoints of each of the cameras so as to enable 3D points in the scene to be mapped to 2D points in the images captured by the cameras. The one or more camera parameters may include, for example, the 3D position of the camera (or, more specifically, the 3D position of an imago sensor on which images are formed and captured by the camera), the yaw, pitch and/or roll of the camera and one or more of various lens parameters of the camera such as focal length and/or aperture size. The camera parameters used will depend on, for example, the exact nature of the scene and the necessary camera setup, and the skilled person will determine the one or more camera parameters to be used together with initial values of these one or more parameters using methods known in the an. Initial values of the camera parameters need only to be approximate, since more accurate values of the camera parameters (and thus a more accurate 3D to 2D mapping) may be generated using the bundle adjustment. The user may provide initial values of each of the camera parameters using, for example, the user interface 312, these initial values then being stored in the storage unit 308.

Also, $b_i$ is a vector representing the 3D position of the ith marker in the scene when there are a total of n markers in the scene for which a 3D position may be determined. As previously described, the 3D position of the volume portion used to establish correspondence for a particular marker may be used as the initial 3D position of that marker in the bundle adjustment function. The bundle adjustment allows a more accurate 3D position of each marker to be generated.

Regarding the other parameters, $v_{ij}=1$ if a marker i is visible in image j and $v_{ij}=0$ if a marker i is not visible in image j, $x_{ij}$ is the projection of marker i on the image j, $Q(a_j, b_i)$ is the predicted projection of marker i on the image j and $d(x, y)$ represents the Euclidean distance between the image points represented by vectors x and y.

The result of the bundle adjustment is that the accuracy of the one or more parameters of the cameras defined by $a_j$ and the 3D position in the scene of each of the markers $b_i$ is improved, leading to a highly accurate model of the scene defined by the determined positions of the markers. Any suitable bundle adjustment algorithm may be used, such as the Levenberg-Marquardt Algorithm. The algorithm and number of iterations (if appropriate) is chosen depending on the level of accuracy required for the 3D model of the scene. The bundle adjustment is carried out by the image processor 304 on the basis of initial values of $a_j$ and $b_i$ stored in the storage unit 308. Then, once the desired level of accuracy of the 3D model has been achieved using the bundle adjustment, the accurate positions of the markers $b_i$ which define the accurate 3D model of the scene are saved in the storage unit 308. It is then this more accurate 3D model of the scene which is used as an input for further processing. The accurate values of the one or more camera parameters $a_j$ may also be saved in the storage unit 308.

In more detail, in order to obtain the more accurate position of the markers, the more accurate camera parameters obtained by the bundle adjustment are fed into the volume construction explained with reference to FIG. 4. As the camera parameters are more accurate, the size of the volume portions is reduced and/or the reprojection errors are made smaller. In other words, by feeding back the more accurate camera parameters into the volume construction of FIG. 4, the 3D model is made more accurate.

Once a 3D model of the scene with a suitable level of accuracy has been generated, further processing may then be carried out on the basis of the model. It will be appreciated that, once a sufficiently accurate 3D model of a particular scene has been generated, the further processing will depend on exactly what the uses wishes to achieve with the model. The possibilities for this are vast. A number of examples are described below, however, so as to illustrate how such a model might be used.

In the case of the scene shown in FIG. 1 comprising the car 100 with outer body 102, one potential application is to compare the generated 3D model of the outer body 102A with a previously generated 3D model 600 (reference model) so as to check whether or not the outer body 102 of the car conforms to, for example, race regulations relating to the size and shape of the outer body 102. In this case, reference model 600 represents a car body size and shape which is known to conform to the race regulations. By overlaying the newly generated 3D model of the outer body 102A of the car 100 onto the reference model 600, the differences between the outer body 102 of the car 100 and an outer body which conforms to the race regulations can be determined.

Figure 6:
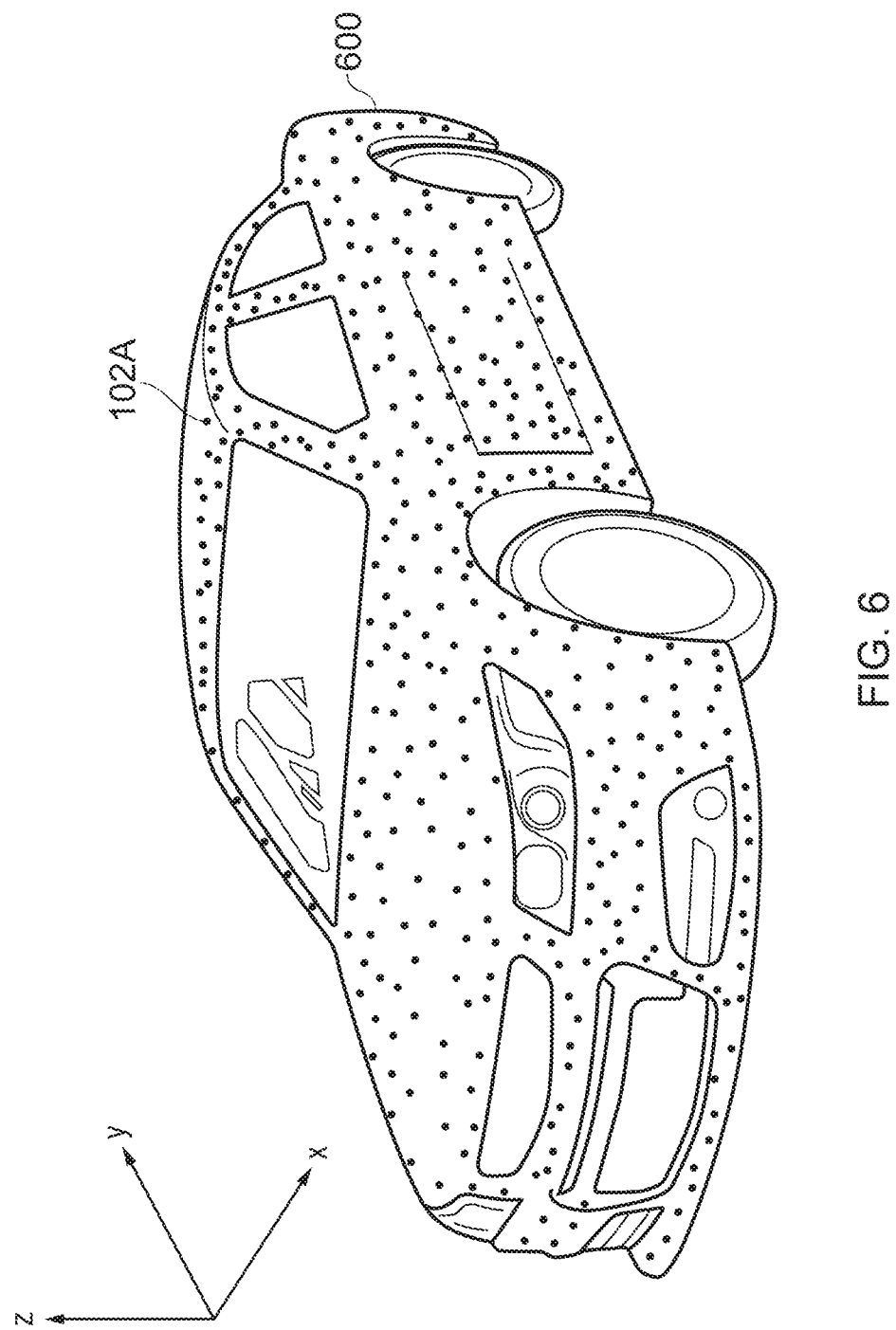
FIG. 6 schematically illustrates a comparison of the generated 3D model of the object with a reference model when the object conforms to the reference model.

In a first example, shown in FIG. 6, it can be seen that the 3D model of the outer body 102A, when overlaid on the reference model 600, closely matches the reference model 600. This close match indicates that the outer body 102 of the car 100 meets the size and shape requirements defined in the race regulations. However, in a second example, shown in FIG. 7, it can be seen that a part of the 3D model of the outer body 102A, when overlaid on the reference model 600, is different to a corresponding part of the reference model 600. This difference is labelled as feature 700 in FIG. 7, and it can be seen that the difference is caused by the rear portion of the outer body 102 extending further than the rear portion of the 3D model 600. In this case, it may be decided, depending on the race regulations, that such an extension of the rear portion of the outer body 102 is not allowed. However, since the user is able to see exactly which part of the outer body 102 does not correspond to the race regulations, the size and/or shape of the outer body can be adjusted appropriately so as to bring the outer body 102 into better conformity with the reference model 600 (and thus the race regulations).

It is noted that the 3D positions of points defining the reference model 600 are stored in the storage unit 308 together with the 3D positions of the markers defining the model 102A to be tested. The reference model may be generated in many ways. For example, the reference model may be generated using a computer imaging technique or, alternatively, may be based on a physical outer body of a car which conforms to the required race regulations and which is converted into a 3D model using the above-described technique.

Figure 7:
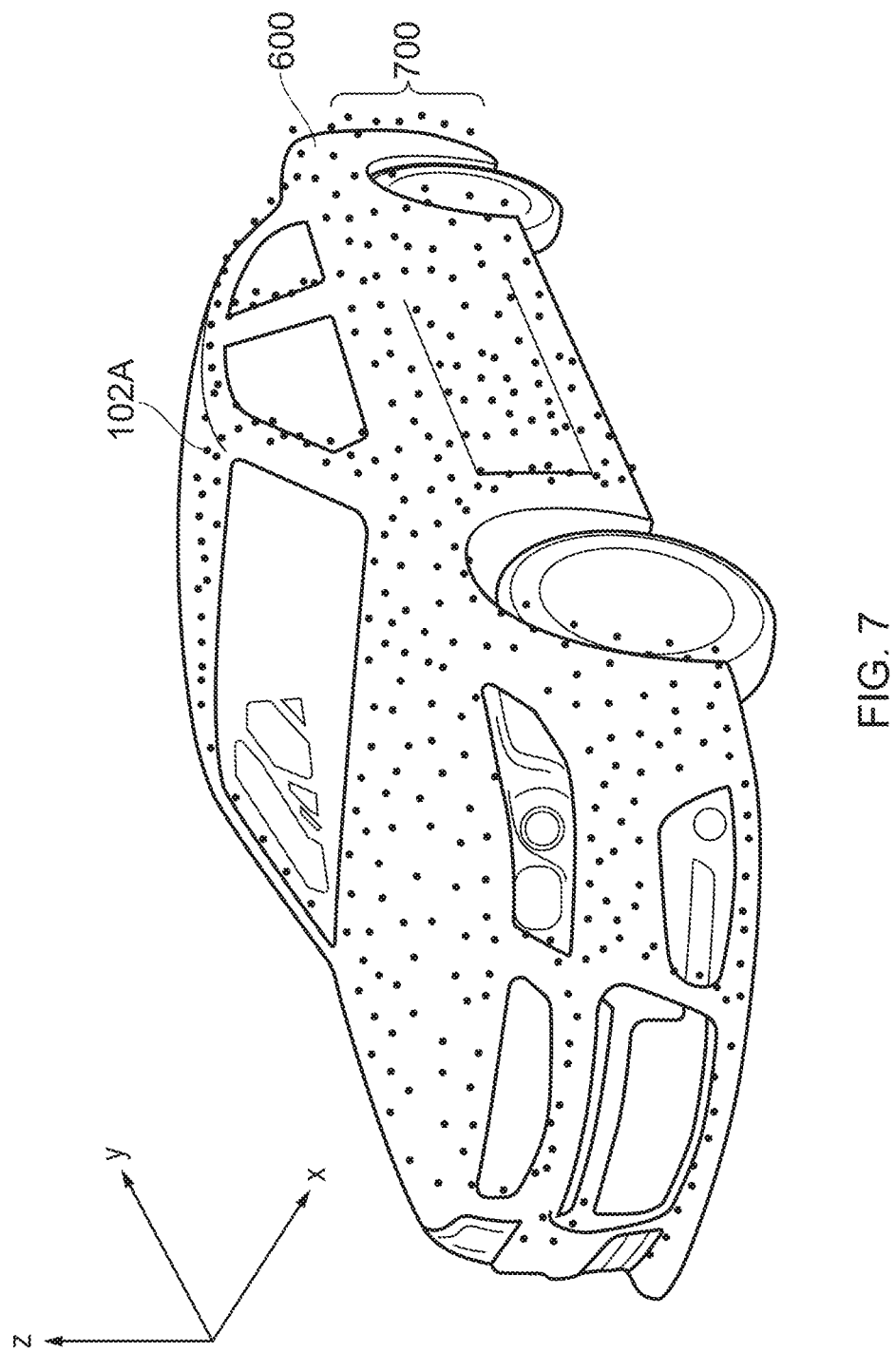
FIG. 7 schematically illustrates a comparison of the generated 3D model of the object with a reference model when the object does not conform to the reference model.

The reference model 600 in FIGS. 6 and 7 is shown as points on a surface. It is the position of each of these points on the surface which is stored in the storage unit 308.

Of course, in other embodiments, the reference model 600 may be defined by a finite number of points in 3D space rather than on a surface.

In one embodiment, in order to test whether the object conforms to the regulations, the reference model surface will be aligned to the 3D model of the surface by solving for rotational and translational values that minimises the sum of the distances between the point on the 3D model and the reference model surface. Once a rotational and translational value is selected, then each point on the 3D model that is greater than a predetermined distance from the corresponding point on the reference image is displayed and highlighted to race officials.

As an alternative, manual method, in order to compare the model 102A to be tested with the reference model 600, the controller 306 may control both models to be simultaneously displayed to the user using the user interface 312 and may process commands received at the user interface 312 so as to allow the user to manually overlay the model 102A to be tested onto the reference model 600

Once the model 102A to be tested is overlaid onto the reference model 600, a comparison of the models can be made.

In the manual embodiment, a manual visual comparison of the two models is made (the models being displayed simultaneously using the user interface 312 so as to allow such a manual visual comparison), thus allowing the user to see any parts of the model 102A being tested which do not fit with the reference model 600 (as shown in FIG. 7, for example).

Various other comparison tools may also be used. For example, in an embodiment, once the model 102A to be tested is overlaid on the reference model 600, a distance between the determined 3D position of each marker of the model 102A to be tested and a corresponding 3D point of the reference model 600 may be calculated. The corresponding 3D point of the reference model 600 for a particular 3D marker position of the model 102A to be tested may be determined as the point of the reference model 600 which is positioned least far away from that particular 3D marker position of the model 102A, for example. If the calculated distance from each of the 3D marker positions to its respective corresponding 3D point of the reference model 600 is within a predetermined threshold, then it is determined that the outer body 102 to which the model 102A relates meets the race requirements. On the other hand, if the calculated distance from one or more of the 3D marker positions to its respective corresponding 3D point of the reference model 600 is greater than the predetermined threshold, then it is determined that the outer body 102 to which the model 102A relates does not meet the race requirements.

It will be appreciated that the skilled person may configure the exact requirements of the outer body 102 relative to the reference model 600 in accordance with the particular race regulations concerned and to store the necessary information (such as the predetermined distance threshold just described) in the storage unit 308 prior to the model comparison taking place. The information may be entered using the user interface 312. In an embodiment, the determination of the distance between each 3D marker position of the model 102A to be tested and the 3D position of the point of the reference model 600 corresponding to that 3D marker position, together with the comparison of that distance with the predetermined threshold, is carried out by the image processor 304.

In an embodiment, if the outer body 102 of the car 100 is found to meet the race regulations on the basis of the above-described technique, then the controller 306 may control the user interface 312 to output information indicating that the race regulations have been met (for example, the user interface 312 may display the word "Pass"). On the other hand, if the outer body 102 of the car 100 is not found to meet the race regulations on the basis of the above-described technique, then the controller 306 may control the user interface 312 to output information indicating that the race regulations have not been met (for example, the user interface 312 may display the word "Fail"). In addition to the simple "Pass"/"Fail" output, the controller 306 may also control the user interface 312 to output further information to the user, such as information indicative of the part of the outer body 102 of the car 100 which does not comply with the race regulations. This information could comprise, for example, an image of the model 102A of the outer body 102 with the part of the model corresponding to the part of the outer body 102 which does not comply with the race regulations being identified (for example, using a different colour or the like). In this case, as well as the user being able to know whether the outer body 102 of the car has passed or failed in meeting the race regulations, an indication of the part of the outer body 102 which has caused a failure is given to the user, thus allowing the user to more easily take measures to rectify the problem.

It will be appreciated that although the example of comparing a generated 3D model of a scene has focussed on generating a 3D model of the outer body 102 of a car for the purpose of race regulation testing, the present technique is not so limited. In fact, it will be appreciated that the above-described technique could be used for comparing any real life scene comprising one or more general objects with a reference model of that scene so as to determine the extent to which that real life scene conforms to the reference model of that scene. It will also be appreciated that the 3D model of the scene need not even be compared with a reference model, but instead may simply be used for acquiring measurements relating to one or more objects in the scene without the need to physically measure those objects. The measurements could include lengths or angles, for example. In one example, also relating to racing cars (such as NASCAR® racing cars), as well as the shape and size of the outer body of each car being analysed using the present technique, the present technique could also be used to analyse characteristics of the chassis of the car. In this case, images are captured of the car without the outer body in place so that the chassis of the car is exposed in the images and so that a 3D model of the chassis can be generated. One or more measurements (such as distance and/or angle measurements) relating to the chassis may then be taken using the generated 3D model so as to determine whether such measurements conform to the race regulations. The same technique could also be applied to any other element of the car, such as the wheels.

Another application of the present technique is now described with reference to FIGS. 8 to 10, which shows how an accurate 3D model of a sports playing area (in this case, a tennis court 800 comprising a playing surface 804 and a net structure 802) may be generated. Although a tennis court 800 is shown in FIGS. 8 to 10, it is noted that the present technique may be used to model a number of different types of sports playing areas, such as, for example, volleyball courts, football pitches and rugby pitches.

Figure 8:
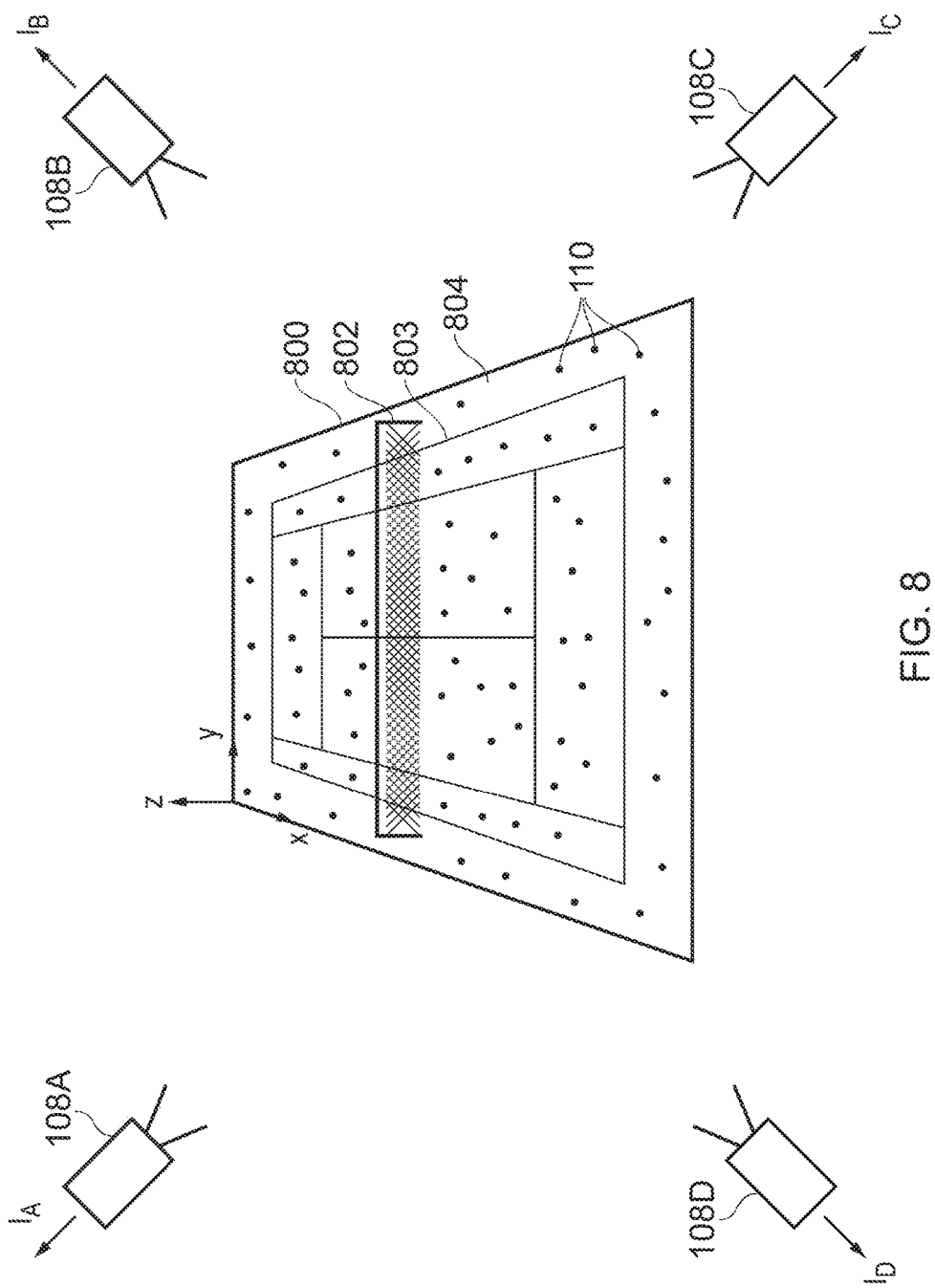
FIG. 8 schematically shows a second scene which is to be modelled.
Figure 9:
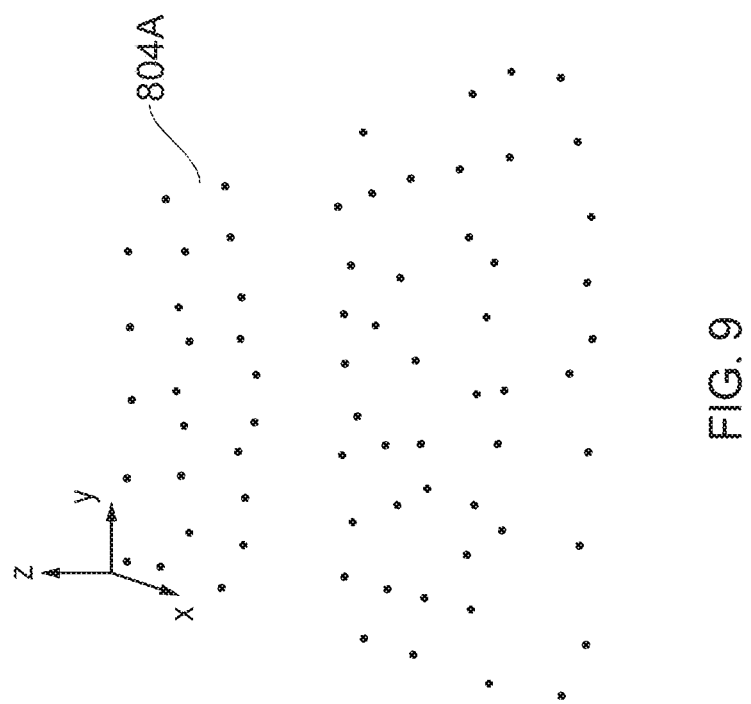
FIG. 9 schematically illustrates a generated 3D model of the second scene.

As shown in FIG. 8, the plurality of cameras 108A-D are now positioned around the tennis court 800, and the markers 110 (which, in this case, are physical markers) are distributed over the surface 804 of the tennis court. Using the present technique as already described, the 3D position of each of the markers 110 in the scene is then determined, and these are used to define a 3D model of the surface 804 of the tennis court. This 3D model 804A is shown in FIG. 9. The 3D model 804A shown in FIG. 9, which is defined by the calculated 3D position of each of the markers 110, has a high level of accuracy due to the use of bundle adjustment, as previously described. In addition, and as also previously described, the use of this bundle adjustment means that the camera parameters defined by the vector $a_j$ are determined to a high level of accuracy.

Figure 10:
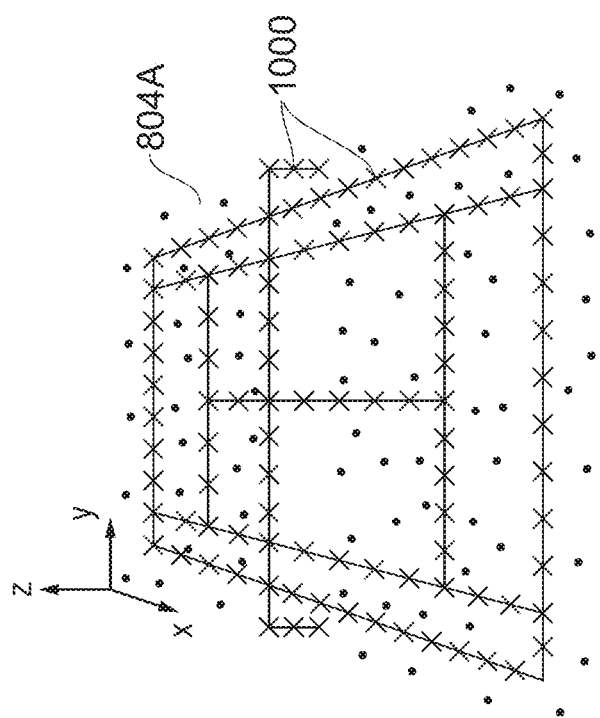
FIG. 10 schematically illustrates the 3D model of the second scene in which additional features are included in the 3D model of the second scene.

As shown in FIG. 10, once the model 804A has been determined to a suitable level of accuracy, a plurality of additional markers 1000 are electronically added to the model 804A by the image processor 304. The additional markers 1000 (shown using a 'X' so as to differentiate them from the calculated position of each the markers 110) represent additional features which should be included in the 3D model of the tennis court, and, in this case, represent the lines 803 defined on the playing surface 804 of the tennis court and the net structure 802 of the tennis court. The initial position of each of the additional markers 1000 is determined on the basis of known characteristics of the tennis court which are, for example, entered by the user using the user interface 312 and stored in the storage unit 308. For example, the user may have entered, in advance of capturing images from each of the cameras 108A-D, information indicating the position and length of each of the lines 803 on the surface 804 of the tennis court and, optionally, of each of the lines defining the net structure 802 of the tennis court.

The image processor 304 then generates the additional markers 1000 on the basis of this information (for example, the image processor may generate additional markers 1000 at a predetermined distance interval along each of the lines 803 on the surface 804 of the tennis court and along each of the lines defining the net structure 802 of the tennis court, based on the information indicating the position and length of these lines input by the user) and includes them in the 3D model 804A.

It will be appreciated that an initial position of each of the additional markers 1000 in the 3D model 804A may be determined arbitrarily, for example. Alternatively, the user may be given the opportunity to determine the initial position of each of the additional markers 1000 by overlaying the additional markers 1000 onto the determined positions of the markers 110 in the 3D model 804A so that the lines defined by the additional markers approximately line up with the corresponding lines (that is, lines 803 and the lines defining the net structure 802) in the real scene. In order to then accurately determine the position of the additional markers 1000 in the model 804A (and hence the position of the lines 803 and the net structure 802 in the model 804A), bundle adjustment is once again used.

Figure 11:
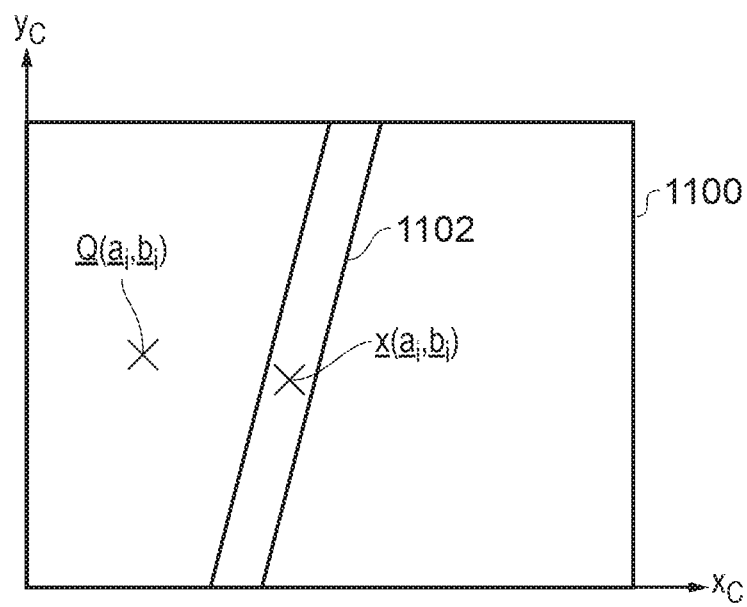
FIG. 11 schematically illustrates the comparison of a predicted projection of a point in an image of the second scene with an actual projection of that point in the image of the second scene.

For the bundle adjustment, equation (1) is once again used. However, this time, $b_i$ is a vector representing the 3D position of the ith additional marker in the scene when there are a total of n additional markers. Regarding the other parameters, $v_{ij}=1$ if an additional marker i is visible in image j and $v_{ij}=0$ if an additional marker i is not visible in image j, $x_{ij}$ is the projection of an additional marker i on the image j, $Q(a_j, b_i)$ is the predicted projection of an additional marker i on the image j and d(x, y) represents the Euclidean distance between the image points represented by vectors x and y. $a_j$ still represents the value of each of the one or more parameters of the cameras. The projection $x_{ij}$ of an additional marker in a particular captured image is determined by the image processor 304 performing an object recognition process on the captured image such as edge detection in order to detect the appearance of one or more of the lines 803 and the lines defining the net structure 802 in the captured image. In this case, a point on a detected line closest to the predicted projection of an additional marker may be determined to be the projection $x_{ij}$, for example. This is illustrated in FIG. 11, for example, in which a line 1102 has been detected in a captured image 1100. The predicted projection of the ith additional marker when the image 1100 is the jth image. $Q(a_j, b_i)$, must be compared with the actual projection of the ith additional marker in the image 1100, $x_{ij}$, in order for the bundle adjustment to be performed. $x_{ij}$ is thus determined to be the closest part of the centre of the detected line 1102 to the projection $Q(a_j, b_i)$. $x_{ij}$ may be determined in this way by the image processor 304 using a least squares method or the like.

Thus, with the present technique, it is possible to quickly and efficiently generate an accurate 3D model of a real life scene by capturing a plurality of images of the scene from different fields of view. All that is initially required is an approximate value of each of one or more parameters of each of the cameras used to capture the images (the one or more parameters allowing a mapping between 3D points in the scene and 2D points in the captured images to be established) and an initial 3D position in the scene of each of a plurality of markers used for defining the 3D model. The initial 3D position in the scene of each of the plurality of markers may be determined on the basis of a plurality of volume portions of a predetermined portion of the scene (as is the case with the markers 110, for example) or on the basis of one or more known characteristics of the scene (as is the case with the additional markers 1000, for example). The use of volume portions also provides a convenient and accurate way of determining a correspondence between images of markers in different captured images of the scene, thus allowing an initial 3D position in the scene of a marker for which such a correspondence is established to be determined. Furthermore, due to the fact that the 3D model does not rely on measurements taken manually by a human, the risk of introducing inaccuracies into the model due to human error is reduced.

In the above description, it will be appreciated that when the 3D (three-dimensional) position of a point in the scene or in the 3D model of the scene is referred to, this position will be defined using a suitable coordinate system. In the given examples, this coordinate system is a 3D Cartesian coordinate system, wherein each 3D position is given by the coordinates (x, y, z). Each of x, y and z are defined using a suitable unit of distance, such as meters. Similarly, it will be appreciated that when the 2D (two-dimensional) position of a point in a captured image of the scene is referred to, this position will be defined using a suitable coordinate system. In the given examples, this coordinate system is a 2D Cartesian coordinate system, wherein each 2D position is given by the coordinates (x, y). Each of x and y are defined using a suitable unit of distance, such as centimeters, millimeters or pixels. It will also be appreciated that when, for example, the 2D or 3D "position" of a marker 110 is mentioned in the above description, the marker 110 actually has a physical size and thus is not fully defined by a single position in space. The 2D or 3D "position" of the marker should thus actually be interpreted as the 2D or 3D position of a predetermined point on the marker, such as the position of the centre of the marker.

Figure 12:
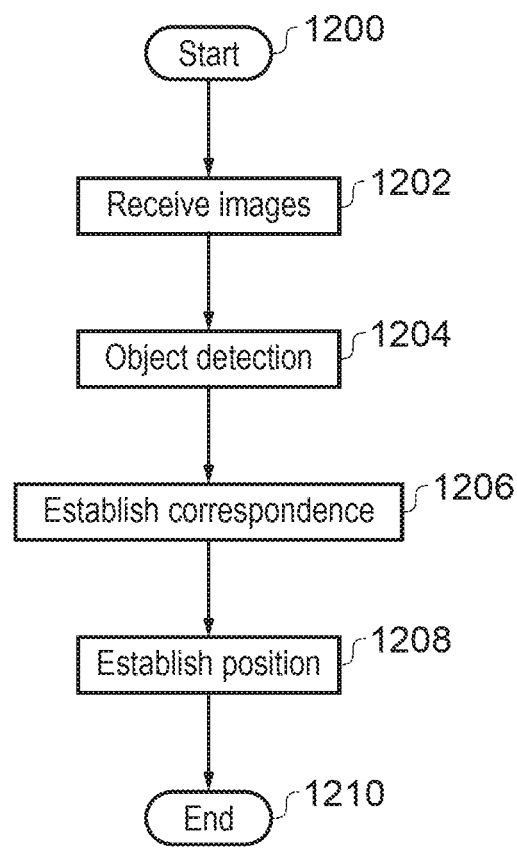
FIG. 12 shows a flow chart schematically illustrating a process.

FIG. 12 shows a flow chart schematically illustrating a method according to the present technique. The process starts at step 1200. At step 1202, a plurality of captured images of the scene is received by the receiver 302 of the image processing apparatus 300. Each respective one of the plurality of images is captured by a camera with a different field of view of the scene. A predetermined portion of the scene with a predetermined volume comprises a plurality of detectable objects (such as markers 110), the predetermined volume being divided into a plurality of volume portions, and each volume portion being within the field of view of at least two of the cameras so that an image of each volume portion appears in at least two of the captured images. At step 1204, for each volume portion in each of the captured images within which an image of that volume portion appears, it is detected, by the image processor 304, whether or not an image of one of the detectable objects in the scene is positioned within a predetermined distance of the position of the image of that volume portion. If an image of one of the detectable objects is detected to be positioned within a predetermined distance of the position of the image of that volume portion in at least two of the images within which an image of that volume portion appears, then a correspondence between the images of the detectable objects detected in the at least two of the images is established by the image processor 304 at step 1206. The correspondence indicates that the images of the detectable objects detected in the at least two of the images correspond to a single detectable object in the scene. At step 1208, the position in the scene of that volume portion is established by the image processor 304 as a position in the scene of the single detectable object. The process then ends at step 1210. After this process is complete, a more accurate position in the scene of each of the detectable objects for which a position has been established may be found using bundle adjustment, thus allowing a highly accurate model of the scene to be generated.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A method of determining the position of an object in a scene, comprising:
   receiving a plurality of captured images of the scene, each respective one of the plurality of images being captured from a different field of view of the scene, wherein a predetermined portion of the scene with a predetermined volume comprises a plurality of detectable objects, the predetermined volume is divided into a plurality of volume portions, and each volume portion is within the captured field of view of at least two of the captured images so that an image of each volume portion appears in the at least two of the captured images;
   detecting, for each volume portion in each of the captured images within which an image of that volume portion appears, whether or not an image of one of the detectable objects in the scene is positioned within a predetermined distance of the position of the image of that volume portion, wherein if an image of one of the detectable objects is detected to be positioned within a predetermined distance of the position of the image of that volume portion in at least two of the images within which an image of that volume portion appears, then a correspondence between the images of the detectable objects detected in the at least two of the images is established, the correspondence indicating that the images of the detectable objects detected in the at least two of the images correspond to a single detectable object in the scene, and the position in the scene of that volume portion is established as a position in the scene of the single detectable object.

2. A method according to clause 1, wherein the position in the scene of each volume portion that is established as a position in the scene of a single detectable object is established as an initial position of that single detectable object, wherein the initial position established for each single detectable object is used as an input, together with one or more initial parameters of each camera used for capturing the plurality of images, for performing bundle adjustment for finding a more accurate position of each single detectable object in the scene and a more accurate one or more initial parameters of each camera.

3. A method according to clause 1 or 2, wherein the detectable objects in the scene comprise one or more light markers each projected from a light source.

4. A method according to any preceding clause, wherein the detectable objects in the scene comprise one or more physical markers.

5. A method according to any preceding clause, wherein the predetermined portion of the scene with the predetermined volume comprises a first object to be modelled and a plurality of the detectable objects are positioned on the first object, and wherein the method comprises generating a model of the first object on the basis of an established position of each detectable object in the scene.

6. A method according to clause 5, wherein the first object is a chassis of a motor vehicle, and the method comprises determining at least one of a distance measurement and an angle measurement associated with the chassis of the motor vehicle on the basis of at least one of a corresponding distance measurement and a corresponding angle measurement, respectively, of the generated model of the chassis of the motor vehicle.

7. A method according to clause 5, wherein the model of the first object is compared to a previously generated model of a second object.

8. A method according to clause 7, wherein the first object is an outer body of a first motor vehicle and the second object is an outer body of a second motor vehicle, and the method comprises determining a distance between a point on the model of the outer body of the first motor vehicle and a corresponding point on the model of the outer body of the second vehicle.

9. A method according to clause 5, wherein the first object is a sports playing area.

10. A method according to clause 9, wherein:
the sports playing area comprises one or more additional objects which are characteristic of the sports playing area, each of the one or more additional objects being detectable in at least two of the captured images;
an initial position in the scene of each of the additional objects is provided on the basis of a known characteristic of the sports playing area and the initial position provided for each of the additional objects is used as an input, together with one or more parameters of each camera used for capturing the plurality of images, for performing bundle adjustment for finding a more accurate position of each of the additional objects in the scene.

11. An apparatus for determining the position of an object in a scene, comprising:
receiver circuitry operable to receive a plurality of captured images of the scene, each respective one of the plurality of images being captured from a different field of view of the scene, wherein a predetermined portion of the scene with a predetermined volume comprises a plurality of detectable objects, the predetermined volume is divided into a plurality of volume portions, and each volume portion is within the captured field of view of at least two of the captured images so that an image of each volume portion appears in the at least two of the captured images;
image processor circuitry operable to detect, for each volume portion in each of the captured images within which an image of that volume portion appears, whether or not an image of one of the detectable objects in the scene is positioned within a predetermined distance of the position of the image of that volume portion, wherein if an image of one of the detectable objects is detected to be positioned within a predetermined distance of the position of the image of that volume portion in at least two of the images within which an image of that volume portion appears, then a correspondence between the images of the detectable objects detected in the at least two of the images is established by the image processor circuitry, the correspondence indicating that the images of the detectable objects detected in the at least two of the images correspond to a single detectable object in the scene, and the position in the scene of that volume portion is established by the image processor circuitry as a position in the scene of the single detectable object.

12. An apparatus according to clause 11, wherein the position in the scene of each volume portion that is established as a position in the scene of a single detectable object is established as an initial position of that single detectable object, wherein the initial position established for each single detectable object is used as an input, together with one or more initial parameters of each camera used for capturing the plurality of images, for the image processor circuitry to perform bundle adjustment for finding a more accurate position of each single detectable object in the scene and a more accurate one or more initial parameters of each camera.

13. An apparatus according to clause 11 or 12, wherein the detectable objects in the scene comprise one or more light markers each projected from a light source.

14. An apparatus according to any one of clauses 11 to 13, wherein the detectable objects in the scene comprise one or more physical markers.

15. An apparatus according to any one of clauses 11 to 14, wherein the predetermined portion of the scene with the predetermined volume comprises a first object to be modelled and a plurality of the detectable objects are positioned on the first object, and wherein the image processor circuitry is operable to generate a model of the first object on the basis of an established position of each detectable object in the scene.

16. An apparatus according to clause 15, wherein the first object is a chassis of a motor vehicle, and the image processor circuitry is operable to determine at least one of a distance measurement and an angle measurement associated with the chassis of the motor vehicle on the basis of at least one of a corresponding distance measurement and a corresponding angle measurement, respectively, of the generated model of the chassis of the motor vehicle.

17. An apparatus according to clause 15, wherein the image processor circuitry is operable to compare the model of the first object to a previously generated model of a second object.

18. An apparatus according to clause 17, wherein the first object is an outer body of a first motor vehicle and the second object is an outer body of a second motor vehicle, and the image processor circuitry is operable to determine a distance between a point on the model of the outer body of the first motor vehicle and a corresponding point on the model of the outer body of the second vehicle.

19. An apparatus according to clause 15, wherein the first object is a sports playing area.

20. An apparatus according to clause 19, wherein:
- the sports playing area comprises one or more additional objects which are characteristic of the sports playing area, each of the one or more additional objects being detectable in at least two of the captured images;
- an initial position in the scene of each of the additional objects is provided to the image processor circuitry on the basis of a known characteristic of the sports playing area; and
- the initial position provided for each of the additional objects is used as an input, together with one or more parameters of each camera used for capturing the plurality of images, for the image processor circuitry to perform bundle adjustment for finding a more accurate position of each of the additional objects in the scene.

21. A recording medium storing a computer program for controlling a computer to perform a method according to any one of clauses 1 to 10.

The invention claimed is:

1. A method of determining a position of an object in a scene, comprising:
- receiving a plurality of captured images of the scene, each respective one of the plurality of images being captured from a different field of view of the scene, wherein a predetermined portion of the scene with a predetermined volume comprises a plurality of detectable objects, the predetermined volume is divided into a plurality of volume portions, and each volume portion is within the captured field of view of at least two of the captured images so that an image of each volume portion appears in the at least two of the captured images;
- detecting, for each volume portion in each of the captured images within which an image of that volume portion appears, whether or not an image of one of the detectable objects in the scene is positioned within a predetermined distance of the position of the image of that volume portion, wherein if an image of one of the detectable objects is detected to be positioned within a predetermined distance of the position of the image of that volume portion in at least two of the images within which an image of that volume portion appears, then a correspondence between the images of the detectable objects detected in the at least two of the images is established, the correspondence indicating that the images of the detectable objects detected in the at least two of the images correspond to a single detectable object in the scene, and the position in the scene of that volume portion is established as a position in the scene of the single detectable object.

2. The method according to claim 1, wherein the position in the scene of each volume portion that is established as a position in the scene of a single detectable object is established as an initial position of that single detectable object, wherein the initial position established for each single detectable object is used as an input, together with one or more initial parameters of each camera used for capturing the plurality of images, for performing bundle adjustment for finding a more accurate position of each single detectable object in the scene and a more accurate one or more initial parameters of each camera.

3. The method according to claim 1, wherein the detectable objects in the scene comprise one or more light markers each projected from a light source.

4. The method according to claim 1, wherein the detectable objects in the scene comprise one or more physical markers.

5. The method according to claim 1, wherein the predetermined portion of the scene with the predetermined volume comprises a first object to be modelled and a plurality of the detectable objects are positioned on the first object, and wherein the method comprises generating a model of the first object on the basis of an established position of each detectable object in the scene.

6. The method according to claim 5, wherein the first object is a chassis of a motor vehicle, and the method comprises determining at least one of a distance measurement and an angle measurement associated with the chassis of the motor vehicle on the basis of at least one of a corresponding distance measurement and a corresponding angle measurement, respectively, of the generated model of the chassis of the motor vehicle.

7. The method according to claim 5, wherein the model of the first object is compared to a previously generated model of a second object.

8. The method according to claim 7, wherein the first object is an outer body of a first motor vehicle and the second object is an outer body of a second motor vehicle, and the method comprises determining a distance between a point on the model of the outer body of the first motor vehicle and a corresponding point on the model of the outer body of the second vehicle.

9. The method according to claim 5, wherein the first object is a sports playing area.

10. The method according to claim 9, wherein:
- the sports playing area comprises one or more additional objects which are characteristic of the sports playing area, each of the one or more additional objects being detectable in at least two of the captured images;
- an initial position in the scene of each of the additional objects is provided on the basis of a known characteristic of the sports playing area; and
- the initial position provided for each of the additional objects is used as an input, together with one or more parameters of each camera used for capturing the plurality of images, for performing bundle adjustment for finding a more accurate position of each of the additional objects in the scene.

11. An apparatus for determining a position of an object in a scene, comprising:
- receiver circuitry operable to receive a plurality of captured images of the scene, each respective one of the plurality of images being captured from a different field of view of the scene, wherein a predetermined portion of the scene with a predetermined volume comprises a plurality of detectable objects, the predetermined volume is divided into a plurality of volume portions, and each volume portion is within the captured field of view of at least two of the captured images so that an image of each volume portion appears in the at least two of the captured images;

image processor circuitry operable to detect, for each volume portion in each of the captured images within which an image of that volume portion appears, whether or not an image of one of the detectable objects in the scene is positioned within a predetermined distance of the position of the image of that volume portion, wherein if an image of one of the detectable objects is detected to be positioned within a predetermined distance of the position of the image of that volume portion in at least two of the images within which an image of that volume portion appears, then a correspondence between the images of the detectable objects detected in the at least two of the images is established by the image processor circuitry, the correspondence indicating that the images of the detectable objects detected in the at least two of the images correspond to a single detectable object in the scene, and the position in the scene of that volume portion is established by the image processor circuitry as a position in the scene of the single detectable object.

12. The apparatus according to claim 11, wherein the position in the scene of each volume portion that is established as a position in the scene of a single detectable object is established as an initial position of that single detectable object, wherein the initial position established for each single detectable object is used as an input, together with one or more initial parameters of each camera used for capturing the plurality of images, for the image processor circuitry to perform bundle adjustment for finding a more accurate position of each single detectable object in the scene and a more accurate one or more initial parameters of each camera.

13. The apparatus according to claim 11, wherein the detectable objects in the scene comprise one or more light markers each projected from a light source.

14. The apparatus according to claim 11, wherein the detectable objects in the scene comprise one or more physical markers.

15. The apparatus according to claim 11, wherein the predetermined portion of the scene with the predetermined volume comprises a first object to be modelled and a plurality of the detectable objects are positioned on the first object, and wherein the image processor circuitry is operable to generate a model of the first object on the basis of an established position of each detectable object in the scene.

16. The apparatus according to claim 15, wherein the first object is a chassis of a motor vehicle, and the image processor circuitry is operable to determine at least one of a distance measurement and an angle measurement associated with the chassis of the motor vehicle on the basis of at least one of a corresponding distance measurement and a corresponding angle measurement, respectively, of the generated model of the chassis of the motor vehicle.

17. The apparatus according to claim 15, wherein the image processor circuitry is operable to compare the model of the first object to a previously generated model of a second object.

18. The apparatus according to claim 17, wherein the first object is an outer body of a first motor vehicle and the second object is an outer body of a second motor vehicle, and the image processor circuitry is operable to determine a distance between a point on the model of the outer body of the first motor vehicle and a corresponding point on the model of the outer body of the second vehicle.

19. The apparatus according to claim 15, wherein the first object is a sports playing area.

20. The apparatus according to claim 19, wherein:
the sports playing area comprises one or more additional objects which are characteristic of the sports playing area, each of the one or more additional objects being detectable in at least two of the captured images;
an initial position in the scene of each of the additional objects is provided to the image processor circuitry on the basis of a known characteristic of the sports playing area; and
the initial position provided for each of the additional objects is used as an input, together with one or more parameters of each camera used for capturing the plurality of images, for the image processor circuitry to perform bundle adjustment for finding a more accurate position of each of the additional objects in the scene.

21. A recording non-transitory computer-readable medium storing a computer program for controlling a computer to perform a method of determining a position of an object in a scene, the comprising:
receiving a plurality of captured images of the scene, each respective one of the plurality of images being captured from a different field of view of the scene, wherein a predetermined portion of the scene with a predetermined volume comprises a plurality of detectable objects, the predetermined volume is divided into a plurality of volume portions, and each volume portion is within the captured field of view of at least two of the captured images so that an image of each volume portion appears in the at least two of the captured images;
detecting, for each volume portion in each of the captured images within which an image of that volume portion appears, whether or not an image of one of the detectable objects in the scene is positioned within a predetermined distance of the position of the image of that volume portion, wherein if an image of one of the detectable objects is detected to be positioned within a predetermined distance of the position of the image of that volume portion in at least two of the images within which an image of that volume portion appears, then a correspondence between the images of the detectable objects detected in the at least two of the images is established, the correspondence indicating that the images of the detectable objects detected in the at least two of the images correspond to a single detectable object in the scene, and the position in the scene of that volume portion is established as a position in the scene of the single detectable object.

* * * * *